United States Patent
Kronogard et al.

[15] 3,635,019
[45] Jan. 18, 1972

[54] GAS TURBINE POWER PLANT

[72] Inventors: Sven-Olof Kronogard; Clas-Olof Kronogard, both of Lomma, Sweden

[73] Assignee: Turbokonsult AB, Malmo, Sweden

[22] Filed: Jan. 20, 1970

[21] Appl. No.: 4,275

Related U.S. Application Data

[63] Continuation-in-part of Ser. No. 672,869, Oct. 4, 1967.

[52] U.S. Cl. ......................................................... 60/39.16
[51] Int. Cl. ............................................................ F02c 3/10
[58] Field of Search ................................................ 60/39.16

[56] References Cited

UNITED STATES PATENTS

| | | | |
|---|---|---|---|
| 3,306,036 | 2/1967 | Wooler | 60/39.16 |
| 3,488,947 | 1/1970 | Miller | 60/39.16 |
| 3,488,952 | 1/1970 | Brille | 60/39.16 |
| 3,494,127 | 2/1970 | Brille | 60/39.16 |
| 3,507,113 | 4/1970 | Herrmann | 60/39.16 |
| 3,514,945 | 6/1970 | Austin | 60/39.16 |

*Primary Examiner*—Clarence R. Gordon
*Attorney*—Holman & Stern

[57] ABSTRACT

A gas turbine power plant may consist of a gas producer, a main power turbine utilized for driving a load, a swell as an auxiliary turbine fed by the same gas producer as the main power turbine and utilized for some auxiliary purpose. In many installations the required output from the main power turbine, as well as from the auxiliary turbine may vary considerably from time to time. These varying working conditions will of course influence the requirements of output from the gas producer.

In order to meet these varying conditions, power transfer means are arranged between the two turbines, as well as between any or both of said turbines, and the gas producer in such a manner that the output from the power-producing components may be utilized in the best way depending on the occasional load imposed on the plant. To facilitate the governing of the plant the main power turbine and the auxiliary turbine each have a rotor arranged in parallel gas passages from the gas producer, and at least one of said turbines is provided with means for governing the gas supply therefrom.

9 Claims, 8 Drawing Figures

3,635,019

GAS TURBINE POWER PLANT

This application is a continuation-in-part of our copending application Ser. No. 672,869 filed Oct. 4, 1967.

CROSS-REFERENCE TO RELATED APPLICATION

In our aobve-mentioned application 672,869 and now U.S. Pat. No. 3,498,057 bearing date of Mar. 3,1970 we have described a gas power turbine plant including the same main components as the present application. This illustrates a number of arrangements in which the rotors of the main and the auxiliary turbines are arranged in series. The present application, will, while taking advantage of the power transfer arrangements claimed in our basic application, provided advanced means for governing the output from the main turbine and the auxiliary turbine, respectively.

BACKGROUND OF THE INVENTION

Many gas turbine power plants of conventional design are not directly suitable for industrial or traction applications, which require great flexibility both with respect to power, heat recovery and speed with maintained low fuel consumption and simplicity of design. Improvements have gradually been made in various respects, but among the practically unsolved problems are still such factors as slow acceleration and poor engine braking, as well as high-part load and idling fuel consumption. Furthermore, to obtain a suitable transmission from the main power take off, and sufficient power and response from the auxiliary power take off implies a hitherto unsolved problem. Also, the requirement of versatility in auxiliary power supply, the control, the transmission losses, and the recovery of exhaust heat energy has not been ideally solved.

BRIEF SUMMARY OF THE INVENTION

The invention relates to a gas turbine power plant, and more particularly to such a plant wherein the gas turbine as main components comprises a compressor, a combustion chamber and a turbine for driving the compressor. The plant further comprises a main power turbine and an auxiliary turbine.

In an earth moving machine, for example, the main turbine may be used for traction purposes, whereas the auxiliary turbine may be connected to the shovel or other implements utilized for working the earth. It is evident that these two turbines hardly ever will be required to operate at full output simultaneously. On the other hand, local conditions may impose heavy extra loads on any of the turbines, which necessitates augmenting the power output therefrom. This extra load will influence the output from the gas producer, which may have to be boosted.

In order to facilitate the operation of the plant, the main power turbine and the auxiliary turbine are arranged in parallel, downstream of the gas producer. Power transfer means as described in our basic application 672,869 are arranged between the two turbines and between either or both of said turbines and the gas producer. In the basic application, the embodiments shown indicate that the rotors of the main and the auxiliary turbines are arranged in series in a common gas passage. This means that the downstream rotor will have to work with an admission pressure which will depend on the energy withdrawn from the gas stream by the upstream turbine. This is disadvantageous on many occasions and in order to obtain a supply to the turbines of gas of the same pressure the rotors of the two turbines are arranged in parallel branches of the gas supply conduit. The two turbines are furthermore provided with governing means to determine the supply of gas from the common source to each of the turbines.

DESCRIPTION OF THE PREFERRED EMBODIMENTS

Figure 1:
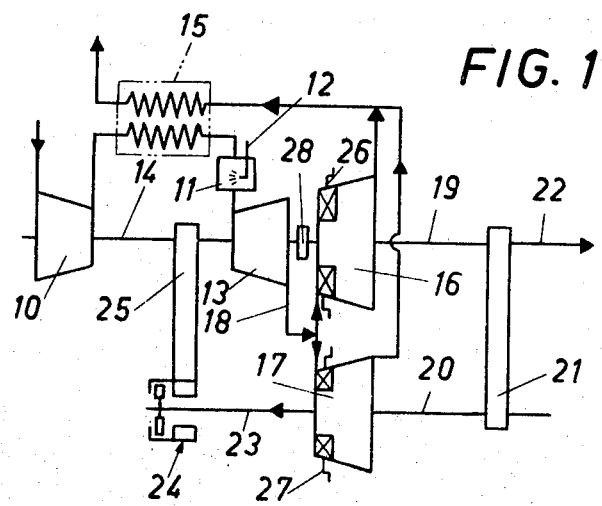
FIG. 1 shows diagrammatically a compact gas turbine plant in which the auxiliary turbine is utilized merely to boost either the main power turbine or the gas producer.

The power plant shown in FIG. 1 contains a gas producer comprising a compressor 10, a combustion chamber 11 provided with fuel burning means 12 and a first turbine 13, which by a shaft 14 is connected to the compressor for driving the same. In the air conduit between the compressor and the combustion chamber a heat exchanger 15 is fitted, in which the air is heated by the exhaust gases from the output turbines.

The plant further comprises a main power turbine 16 and an auxiliary turbine 17. The turbines 16 and 17 are arranged in parallel in a gas conduit 18 downstream of the gas producer turbine 13, in such a manner that the rotors of said main and auxiliary turbines will be supplied with gas of the same initial pressure.

The output shaft of the main power turbine is denoted 19 and that of the auxiliary turbine 20. These two shafts are interconnected by a power transfer means 21 of arbitrary known type for instance a planetary gear possibly including a free wheel to permit the auxiliary turbine to supply any surplus power to the output shaft of the main power turbine. An external shaft 22 connected to the power transfer means delivers the output from the plant to any desired consumer.

The auxiliary turbine 17 is, by a further shaft 23, a clutch 24 and a second power transfer means 25 of arbitrary kind, connected to the shaft 14 of the gas producer. In this manner, the output from the auxiliary turbine may, at will, be utilized to boost the output from the main power turbine, or the gas producer, or both.

It is evident that the power transfer means may be utilized for engine braking purpose on such occasions when the plant is utilized as driving unit for a vehicle. A torque at shaft 22 may, by the first transfer means 21, be transmitted to turbines 16 and 17 and from the latter further to the gas producer means to drive the compressor thereof. By adjustment of the governing means of the gas flow to the main and to the auxiliary turbine for any desired resistance to flow may be obtained in the gas passage, thus controlling the braking effect.

In order to facilitate governing of the plant, the main power turbine is provided with adjustable inlet vanes 26 and the auxiliary turbine is provided with adjustable inlet vanes 27. The geometry of these adjustable inlet vanes is determined by suitable governing means of known type not shown on the drawings. Furthermore, the supply of fuel to the combustion chamber 11 is automatically governed by suitable means of known type, in such a manner that the fuel supply will vary with the requirements imposed on the load of the plant. A power transfer means 28 may be arranged between the gas producer turbine 13 and the main turbine 16. At part loads it is advantageous to permit the gas producer turbine to supply some of the external power either through 25, 23, 21 or directly through 28. A better fuel economy of the gas producer part is obtained if this is allowed to operate at a higher load than would correspond to the actual part load of the plant.

Figure 2:
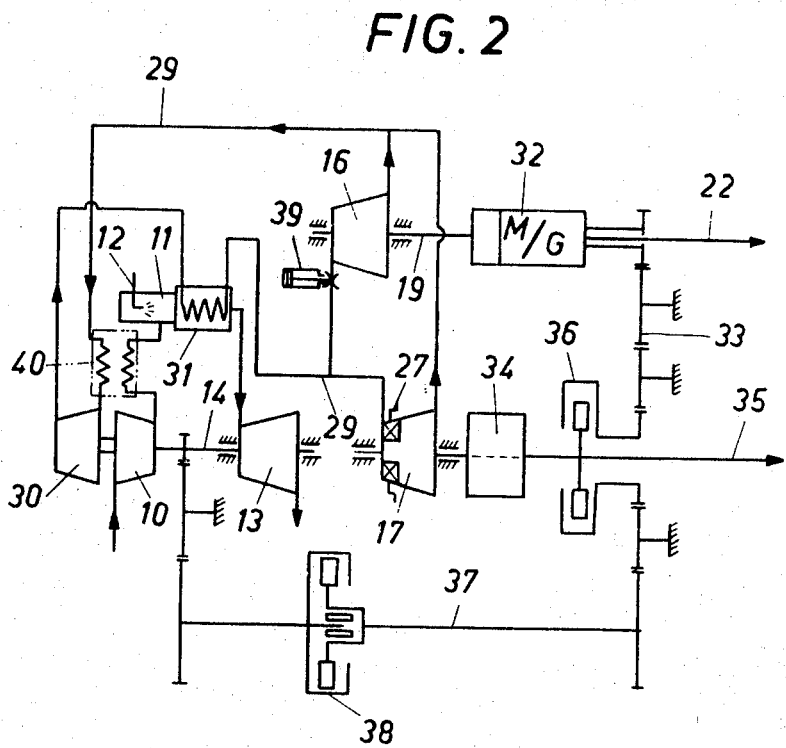
FIG. 2 shows diagrammatically a more complex installation, in which the auxiliary turbine, beside the functions shown in FIG. 1, will also yield external power.

The plant shown in FIG. 2 comprises the same main components as the plant of FIG. 1, i.e., a gas producer having a compressor 10, a combustion chamber 11 with fuel supply means 12, and a compressor driving turbine 13, as well as a main power turbine 16 and an auxiliary turbine 17. The last mentioned turbines are here, however, fitted into a closed gas circulation system 29, including a compressor 30 driven by the gas producer turbine 13. A heat exchanger 40 is included in the circulation system 29 upstream of the compressor 30 in which air leaving the compressor 10 is heated before entering the combustion chamber 11. In this system, the gas is heated in a heat exchanger 31 arranged as an extension of the combustion chamber 11. Also on this occasion the main and the auxiliary turbines are arranged in parallel in the gas supplying conduit, and will receive gas of the same pressure.

It will be appreciated that the compressor 10 is associated with the gas producer part proper, and the compressor 30 is included in the closed circuit feeding the turbines 16 and 17. The gas in such circuit is indirectly heated in heat exchanger 31, passes through the turbines and is returned to the compressor via heat exchanger 40 in which the gas gives away residual heat to the air being fed to the combustion apparatus.

The output shaft 19 of the main power turbine is, by way of a power transfer means 32, here designed as an infinitely adjustable transmission of the motor/generator type, connected to an external power supply shaft 22, as well as to a gear train 33.

The auxiliary turbine 17 drives an electric generator 34, and its output shaft further provides external power by way of shaft 35. This shaft may further, by means of a clutch 36, by connected to the gear train 33.

The latter may, by way of a further shaft 37, and a clutch and freewheel combination 38, be connected to shaft 14 of gas producer unit.

In this manner power may be transferred either way between the main and the auxiliary turbine, as well as between the two output turbines and the gas producer means. The auxiliary turbine 17 is provided with adjustable inlet vanes 27 in the same manner as in FIG. 1, whereas the gas supply to the main turbine is governed by means of a manually or servomotor operated variable admission nozzle 39. In the plant according to FIGS. 3 and 4 the three turbines 13, 16, 17 are arranged with their shafts parallel and in essentially the same plane. The inlets of the main and the auxiliary turbines 16, 17 are, as is best shown in FIG. 4, turned towards the outlet of the compressor turbine 13. The divided outlet volute chambers 39 and 40 of the turbines 16 and 17, respectively.

Valve members 41 and 42 in the outlet chamber from turbine 13 direct the exhaust gas from the turbine 13 in desired quantities to the turbines 16 and 17. Heat exchangers 43 and 44, now shown in FIG. 3, will aid in transferring energy from the exhaust gases from the turbines 16 and 17 to the air supplied to the combustion chamber 11.

Figure 5:
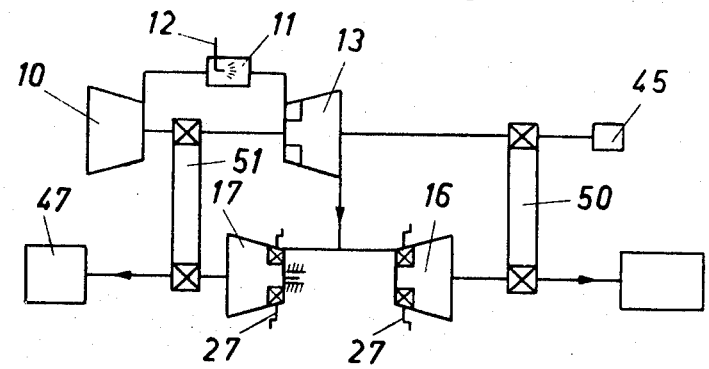
FIG. 5 shows diagrammatically a further layout of a gas turbine plant having main and auxiliary turbines connected in parallel downstream of the gas producer means.

The compressor turbine 13 drives a load 45 and the turbines 16 and 17 drive loads 46 and 47 respectively. The shafts of the three turbines are interconnected by a power transfer means 48, which makes possible a transfer of power in any direction between any two shafts. As is clearly evident from FIG. 3, bearings 49 of the burgines are easily accessible and are located in such a manner that they may be cooled in a satisfactory manner. With this design it is possible to mount all three turbines in a common housing and nevertheless all power takeoffs and governing means are easily accessible The use of a common housing makes possible the use of a single lubricating pump for all three turbines, as well as a single drain pump, which simplifies the installation and makes overhaul easier. In FIG. 5 the main components are denoted by the same reference numerals as in the previous figures. The shafts of turbines 16, and 17 are, aligned and are by separate transmissions 50 and 51, connected to the shaft of turbine 13.

Figure 6:
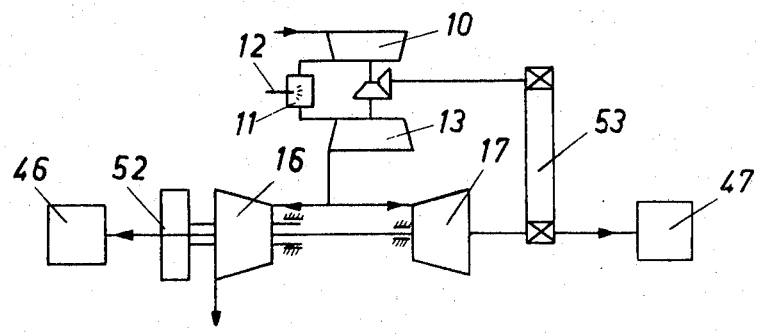
FIGS. 6 and 7 show diagrammatically two further embodiments of such plants.

The plant according to FIG. 6 contains a compressor-turbine combination 10, 13 of the gas producer means having its shaft arranged perpendicularly to those of the main and the auxiliary turbines 16 and 17, which are aligned. The main power turbine drives a load 46 and the auxiliary turbine drives a load 47. In an air cushion vehicle, load 46 may represent the fans supplying air to lift the vehicle, and load 47 may represent the air propellers or other driving means for bringing about the horizontal movement. In this case, load 46 may be mainly constant in sue, whereas load 47 will vary considerably. Here it may be sufficient to have variable or partial admission means at turbine 17, while turbine 16 may be designed for full admission. An adjustment of the power output of turbine 16 is then brought about my an alteration of the gas supply from the gas producer means. There is a power transmission means 52 between turbine 16 and the shaft of the auxiliary turbine 17, and a further transmission 53 between the shaft of the turbine 17 and the shaft of the compressor turbine 13. Load 47 and the gas producer means may be augmented form turbine 16, where surplus power is obtained by a raised gas pressure.

Figure 3:
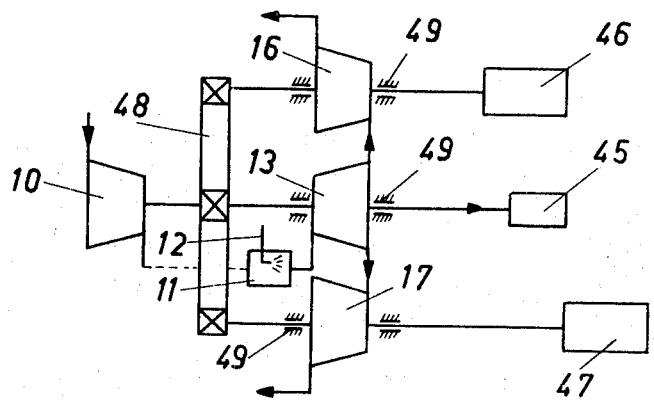
FIG. 3 shows diagrammatically an all threeturbins are interconnected by a common power transfer means, and in which each turbine drives a load.
Figure 4:
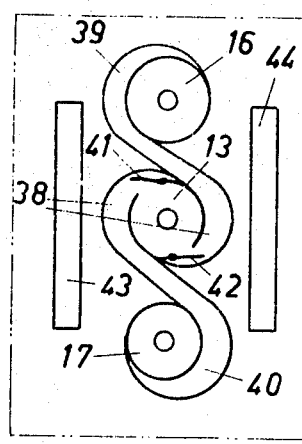
FIG. 4 is an end view of the turbines showing the manner of gas transfer from the compressor turbine to the main and the auxiliary turbines.
Figure 7:
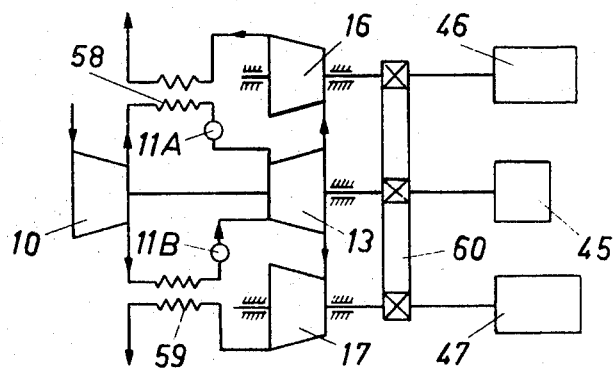
Figure 8:
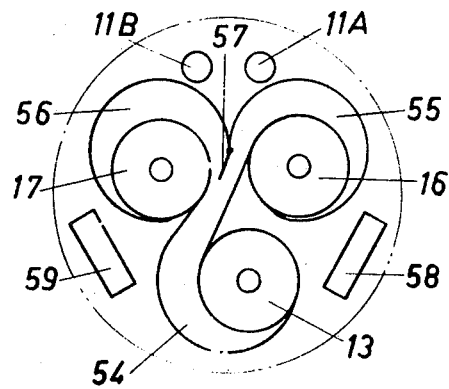
FIG. 8 is an end view of the turbines included in FIG. 7.

FIGS. 7 and 8 show a plant of basically the same arrangement as in FIGS. 3 and 4. The turbines are here mounted in a common housing with their shafts at the apexes of a triangle. The outlet volute 54 of the compressor turbine 13 is directly connected to the inlet volutes 55 and 56, respectively, of the main and the auxiliary turbines 16 and 17. A flap valve 57 will direct the exhaust from turbine 13 into the other turbines in desired proportions.

A heat exchanger 58, 59 is arranged at the outlet of each of the main and the auxiliary turbines, and two combustion chambers 11A and 11B are fitted. A power transmission 60 interconnects the shafts of all three turbines.

The gas producer means may be designed to run at constant speed, and load 45 may be an electric generator supplying current for auxiliary purposes. In a locomotive plant, for instance, in a train or in a large road vehicle, a considerable amount of power is required for air conditioning and/or cooling purposes also when the train or vehicle is at a stand still. This power may be delivered by the gas producer unit, which is the only part of plant necessarily being in operation during stand still. This means a great improvement in fuel economy.

We claim:

1. A gas turbine power plant comprising a gas producer means defined by a compressor, a turbine for driving the compressor and a combustion chamber, a main power turbine and an auxiliary turbine, each of said turbines having a rotor arranged in a branch conduit from a common gas passage from the gas producer means, a power take off means for said main power turbine, a power take off means for said auxiliary turbine, a first power transfer means arranged to transfer at will an arbitrary portion of the output between the auxiliary turbine and the compressor turbine of the gas producer means, second power transfer means arranged to transfer at will an arbitrary portion of the output between the auxiliary turbine and the main power turbine, and at least one of said main and auxiliary turbines being provided with means for governing the gas supply from said common gas passage to its rotor.

2. The gas turbine power plant according to claim 1 in which a further power transfer means is arranged to transfer at will an arbitrary portion of the output between the main power turbine and the compressor turbine of the gas producer means.

3. The gas turbine power plant according to claim 1 in which the main power turbine is provided with an output shaft, the auxiliary turbine being permanently connected to the output shaft of the main power turbine by a power transfer means including a freewheel, and to the gas producer means by power transfer means including a disengageable clutch.

4. The gas turbine power plant according to claim 1 in which said main and auxiliary turbines each is provided with an output shaft, the output shafts of the main and the auxiliary turbines, as well as the gas producer means being interconnected by a power transferring gear train, the main power turbine being connected to said gear train by an infinitely variable power transfer mechanism, and the auxiliary turbine and the gas producer means each being connected to said gear train by a disengageable clutch.

5. The gas turbine power plant according to claim 1 in which the main and the auxiliary turbine are contained in a closed gas circulation system passing through and being indirectly heated by the combustion chamber of the gas producer means.

6. The gas turbine plant according to claim 1 in which inlet chambers of the main and the auxiliary turbines provide direct continuations of an outlet chamber of the compressor turbine, and valve means being arranged to direct the flow of exhaust gas from said outlet chamber into said inlet chambers in suitable proportions.

7. The gas turbine plant according to claim 6 in which a single valve means is arranged to direct the flow into the two inlet chambers.

8. The gas turbine plant according to claim 6 in which a valve means is arranged to govern the flow into each inlet chamber.

9. The gas turbine plant according to claim 1 in which the load on either of the main or the auxiliary turbines is mainly constant in use, with the constant load turbine operating with a full admission whereas the other of the two turbines is provided with means for governing the gas supply thereto, and adjustment of the output from the constant load turbine being effected by an alteration of the gas supply from the gas producer means.

* * * * *